United States Patent
Abou-el-ella et al.

(10) Patent No.: US 9,602,346 B1
(45) Date of Patent: Mar. 21, 2017

(54) CONFIGURATION DATA HANDLING IN WIRELESS COMMUNICATION DEVICES

(71) Applicant: Sprint Communications Company L.P., Overland Park, KS (US)

(72) Inventors: Hassan Abou-el-ella, Overland Park, KS (US); Chandrasekhar Gogineni, Leesburg, VA (US); Jason M. Farmer, Olathe, KS (US); Bret Dean Sumner, Lawrence, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 127 days.

(21) Appl. No.: 14/567,462

(22) Filed: Dec. 11, 2014

(51) Int. Cl.
*H04L 12/24* (2006.01)

(52) U.S. Cl.
CPC ................... *H04L 41/0813* (2013.01)

(58) Field of Classification Search
None
See application file for complete search history.

(56) References Cited

U.S. PATENT DOCUMENTS

| | | | |
|---|---|---|---|
| 8,180,927 B2 * | 5/2012 | Hallamaa | G06F 9/466 710/5 |
| 8,219,664 B2 | 7/2012 | Sahinoja et al. | |
| 8,321,552 B2 * | 11/2012 | Luo | H04L 41/0233 709/223 |
| 8,392,545 B2 | 3/2013 | Hallamaa et al. | |
| 8,489,762 B2 * | 7/2013 | McGinn | H04N 21/23605 709/225 |
| 8,543,679 B2 | 9/2013 | Luo et al. | |
| 8,671,226 B2 | 3/2014 | Hallamaa et al. | |
| 2005/0010552 A1 | 1/2005 | Kaappa et al. | |
| 2005/0010585 A1 | 1/2005 | Sahinoja et al. | |
| 2007/0165654 A1 * | 7/2007 | Chai | H04L 12/24 370/401 |
| 2007/0250933 A1 | 10/2007 | Rantanen | |
| 2008/0133586 A1 * | 6/2008 | Sathish | G06F 17/30914 |
| 2008/0184261 A1 * | 7/2008 | Jun | H04L 41/12 719/313 |
| 2008/0317006 A1 * | 12/2008 | Li | H04L 12/24 370/352 |
| 2009/0044191 A1 * | 2/2009 | Chai | H04W 8/245 718/102 |

(Continued)

*Primary Examiner* — Andrew Lai
*Assistant Examiner* — Jamaal Henson

(57) ABSTRACT

Enhanced handling of device configuration data in wireless communication devices is provided herein. In one example, a method is presented that includes receiving data transferred by a device management node for incorporation into a node of a configuration data tree that stores device configuration data for the wireless communication device. The method also includes identifying the data as unable to be incorporated into the configuration data tree, and transferring a rejection notice for delivery to the device management node. The method also includes receiving a node addition instruction and responsively creating a new data tree that is populated with at least one blank node and is linked to a root node shared with the configuration data tree. The method also includes receiving again the data transferred by the device management node and responsively incorporating the data into the blank node of the new data tree.

20 Claims, 5 Drawing Sheets

(56) References Cited

U.S. PATENT DOCUMENTS

| | | | |
|---|---|---|---|
| 2011/0231537 A1* | 9/2011 | Song | H04L 41/0213 709/223 |
| 2011/0238806 A1* | 9/2011 | Bhat | H04L 29/12566 709/223 |
| 2013/0159526 A1* | 6/2013 | Yu | H04L 29/06 709/225 |
| 2014/0040973 A1 | 2/2014 | Bhat | |

* cited by examiner

CONFIGURATION DATA HANDLING IN WIRELESS COMMUNICATION DEVICES

TECHNICAL FIELD

Aspects of this disclosure are related to the field of wireless communications, and in particular to wireless communication systems and wireless communication devices.

BACKGROUND

Wireless communication systems can include user devices, such as cellular communication devices, that can receive wireless access to communication services from various access nodes of a cellular communication network distributed over a geographic area. The user devices can include various other transceivers and interfaces for communicating over different wired and wireless links. Various configuration data can be stored on the user devices. This configuration data can include parameters and information related to the user devices and the wireless access, such as device identifiers, phone numbers of the devices, identities, access parameters, service parameters, or other data. However, data structures and associated information associated with the configuration data can be predetermined and not allow flexibility in the configuration of the user devices.

One example of the configuration data includes the Open Mobile Alliance (OMA) Device Management (DM) tree. The OMA DM comprises protocols, configuration specifications, and data structures for handling configuration data between management entities and user devices. The OMA DM can handle provisioning of user devices, enabling and disabling features of the user devices, configuration of parameters and settings on the user device, software upgrades, and fault management for the user devices, among other user device properties.

OVERVIEW

Systems, methods, apparatuses, and software for handling device configuration data in wireless communication devices are provided herein. In one example, method is presented that includes receiving a configuration change request transferred by a device management node, the configuration change request comprising payload data for incorporation into one of a plurality of nodes of a configuration data tree that stores at least the device configuration data for the wireless communication device. The method also includes identifying the payload data as unable to be incorporated into the configuration data tree, and responsively rejecting the configuration change request by at least transferring a rejection notice for delivery to the device management node. The method also includes receiving a node addition instruction transferred by the device management node, and responsively creating a new data tree that is populated with at least one blank node and is linked to a root node shared with the configuration data tree. The method also includes receiving a further configuration change request transferred by the device management node, the further configuration change request comprising the payload data for incorporation into the new data tree, and responsively incorporating the payload data into the blank node of the new data tree.

In another example, a wireless communication device is provided. The wireless communication device includes a network transceiver configured to receive a configuration change request transferred by a device management node, the configuration change request comprising payload data for incorporation into one of a plurality of nodes of a configuration data tree that stores at least the device configuration data for the wireless communication device. The wireless communication device includes processing circuitry configured to identify the payload data as unable to be incorporated into the configuration data tree, and responsively reject the configuration change request by at least transferring a rejection notice for delivery to the device management node. The network transceiver is configured to receive a node addition instruction transferred by the device management node, and the processing circuitry configured to responsively create a new data tree that is populated with at least one blank node and is linked to a root node shared with the configuration data tree. The network transceiver is configured to receive a further configuration change request transferred by the device management node, the further configuration change request comprising the payload data for incorporation into the new data tree, and the processing circuitry configured to responsively incorporate the payload data into the blank node of the new data tree.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
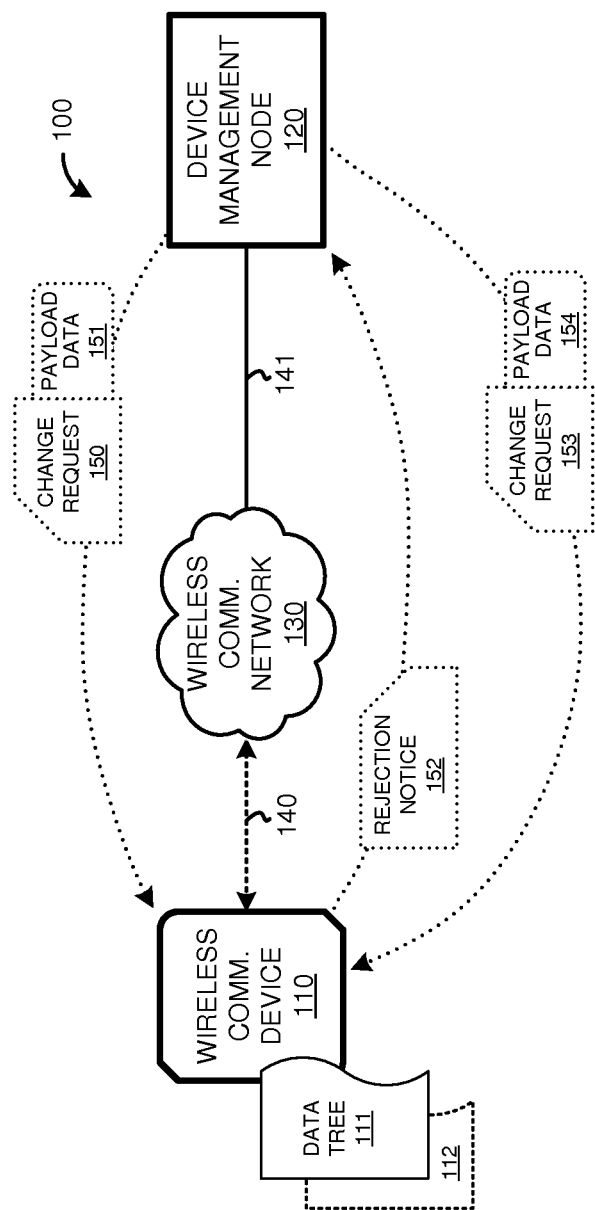
FIG. 1 is a system diagram illustrating a communication system.

FIG. 1 is a system diagram illustrating communication system 100. Communication system 100 includes wireless communication device 110, device management node 120, and wireless communication system 130. Wireless communication device 110 and wireless communication network 130 communicate over at least wireless link 140. Device management node 120 and wireless communication network 130 communicate over link 141.

In operation, wireless communication device 110 receives wireless access to communication services over wireless link 140. One or more wireless access nodes of wireless communication network 130 can provide this wireless access, and these wireless access nodes can be distributed over a geographic area. Wireless communication device 110 includes configuration data in at least one data structure of wireless communication device 110. This configuration data can relate to various parameters and properties of wireless communication device 110, such as access parameters, service parameters, device identifiers, operating software information, phone numbers, user identifiers, or other parameters and properties of wireless communication device 110, including combinations and variations thereof.

In FIG. 1, the configuration data for wireless communication device 110 is stored in at least data tree 111. Data tree 111 comprises a tree data structure stored on at least one computer readable media of wireless communication device 110. During operation, wireless communication device 110 may receive changes or additions to the various elements of the configuration data. However, in many examples, data tree 111 is fixed by a predetermined standards body or original equipment manufacturer and some changes or additions might not be able to be incorporated into data tree 111.

Figure 2:
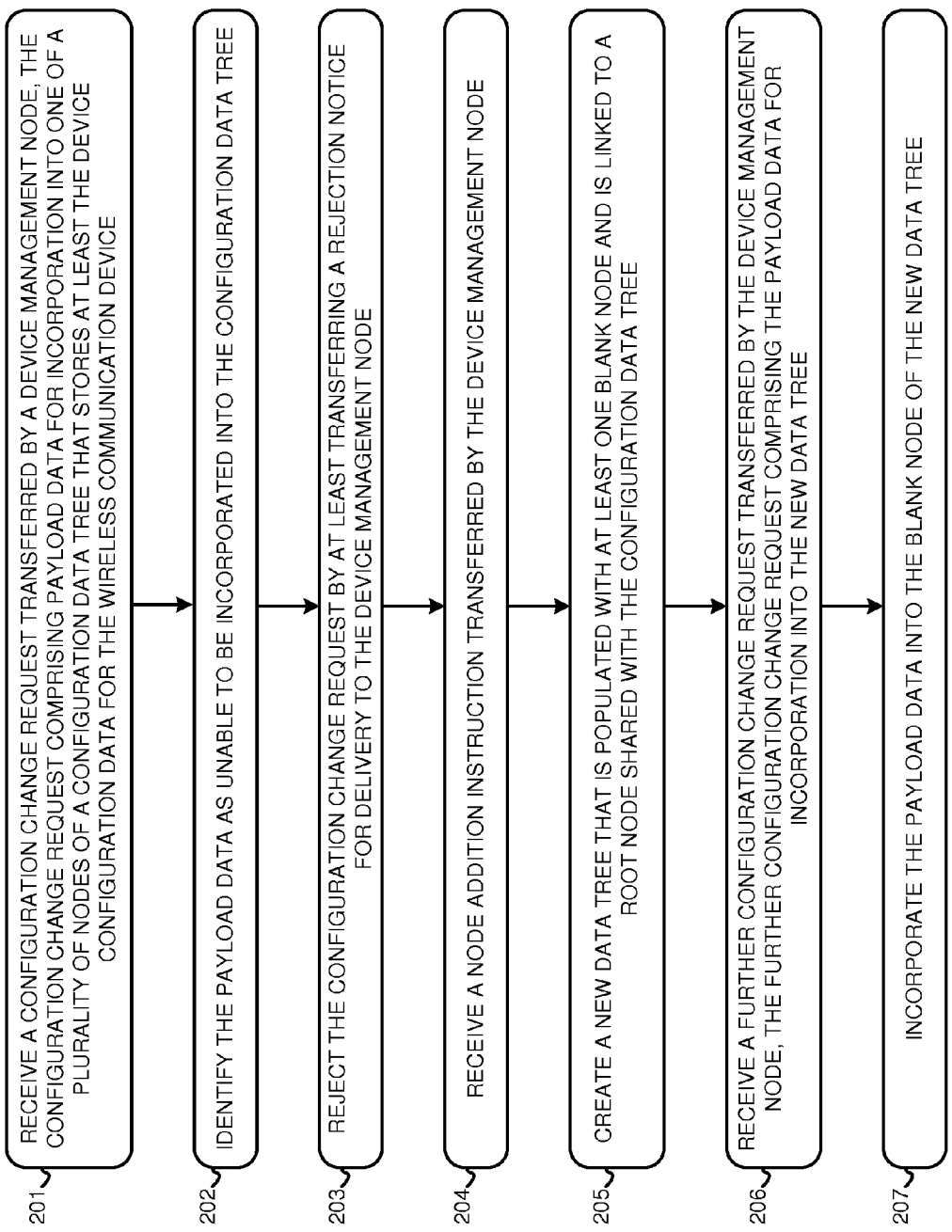
FIG. 2 is a flow diagram illustrating a method of operation of a wireless communication device.

To provide for enhanced operation of wireless communication device 110 in handling configuration data, FIG. 2 is presented. FIG. 2 is a flow diagram illustrating a method of operation of wireless communication device 110. The operations of FIG. 2 are listed below parenthetically. In FIG. 2, wireless communication device 110 receives (201) configuration change request 150 transferred by device management node 120. Configuration change request 150 comprises payload data 151 for incorporation into at least one of a plurality of nodes of configuration data tree 111 that stores at least the device configuration data for wireless communication device 110.

The configuration change request can comprise a request to change a parameter or property of wireless communication device 110 that is stored within data tree 111. These parameters or properties are mentioned above for the configuration data, among other parameters and properties. Payload data 151 comprises the configuration data along with any associated indicators such as a payload type, node type, configuration data type, or other indicator.

Wireless communication device 110 identifies (202) payload data 151 as unable to be incorporated into configuration data tree 111. In this example, configuration change request 150 might be attempting to replace data in an existing node of data tree 111, or add a node into data tree 111. Data tree 111 is comprised of a plurality of predetermined fixed nodes and node types. Attempts to change or alter the nodes or node types can be rejected by wireless communication device 110.

Wireless communication device 110 rejects (203) configuration change request 150 by at least transferring rejection notice 152 for delivery to device management node 120. Rejection notice 152 can indicate that configuration change request 150 was directed to changes that data tree 111 could not accommodate, such as to nodes or node types that cannot be changed by wireless communication device 110. Rejection notice 152 can indicate the payload data included with configuration change request 150. In further examples, when configuration change request 150 is directed to changes that data tree 111 can accommodate, then wireless communication device 110 can transfer a success notice for delivery to device management node 120.

Wireless communication device 110 receives (204) a node addition instruction transferred by device management node 120. Responsive to rejection notice 152, device management node 120 transfers a node addition instruction for delivery to wireless communication device 110. The node addition instruction can indicate a node type or a node property, or can indicate that a new blank or generic node should be added to configuration data stored by wireless communication device 110.

Wireless communication device 110 creates (205) new data tree 112 that is populated with at least one blank node and is linked to a root node shared with configuration data tree 111. In FIG. 1, new data tree 112 is shown as added by wireless communication device 110 in addition to existing data tree 111. Data tree 111 and data tree 112 can share a root element, such as a root node. Data tree 111 and data tree 112 can be traversable via the root node. Data tree 112 is populated by one or more leaf nodes. These one or more nodes comprise blank or generic nodes which are not populated by configuration data.

Wireless communication device 110 receives (206) further configuration change request 153 transferred by device management node 120. Further configuration change request 153 comprises payload data 154 for incorporation into new data tree 112. In this example, payload data 154 includes payload data 151, and can comprise the same payload data. Responsive to configuration change request 153, wireless communication device 110 incorporates (207) payload data 154 into a blank node of new data tree 112. Data tree 111 cannot accommodate payload data 151 or 154 in this example, and the configuration data indicated by payload data 151 or 154 is instead incorporated into one or more blank or generic nodes of data tree 112. Incorporation into data tree 112 can include overwriting a default or placeholder data portion of the blank node, and reconfiguring the type of the blank node to correspond to a configuration data type indicated by configuration change request 153. Wireless communication device 110 can store further configuration change request data in data tree 112.

Returning to the elements of FIG. 1, wireless communication device 110 comprises transceiver circuitry, processing circuitry, and user interface elements. The transceiver circuitry typically includes amplifiers, filters, modulators, and signal processing circuitry. Wireless communication device 110 can also include user interface systems, network interface card equipment, memory devices, non-transitory computer-readable storage mediums, software, processing circuitry, or some other communication components. Wireless communication device 110 can be a wireless communication device, subscriber equipment, customer equipment, access terminal, smartphone, telephone, mobile wireless telephone, personal digital assistant (PDA), computer, e-book, mobile Internet appliance, wireless network interface card, media player, game console, or some other wireless communication apparatus, including combinations thereof. In this example, wireless communication device 110 includes multiple transceiver portions or antenna portions, among other circuit and equipment elements, for communicating wirelessly with multiple wireless communication networks, using different wireless communication modes or wireless communication protocols.

Wireless communication network 130 comprises communication and control systems for providing access to communication services for user devices and networks. Wireless communication network 130 can provide communication services including communication routing, link bridging, network communications, data exchange, or other communication services. In some examples, wireless communication network 130 is a cellular voice and data network that can provide voice calls, text messages, data access, or other communication services provided over cellular or wireless communication networks. In some examples, wireless communication network 130 includes equipment to provide wireless access to communication services within different coverage areas to user devices, route communications between content providers and user devices, and facilitate handoffs between equipment of different coverage areas, among other operations. Wireless communication network 130 can also comprise elements such as radio access network (RAN) equipment, E-UTRAN Node B equipment, eNodeB equipment, Evolved Node B equipment, Mobility Management Entity (MME) equipment, interworking functions (IWF), Home Subscriber Servers (HSS), Policy and Charging Rules Function nodes (PCRF), packet data network gateways (PGW), serving gateways (SGW), Evolved Universal Terrestrial Radio Access (E-UTRA) network equipment, base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), configuration nodes, management nodes, Internet access nodes, telephony service nodes, databases, or other communication and control equipment.

Device management node 120 comprises computer processing systems and equipment. Device management node 120 can include communication or network interfaces, as well as computer systems, microprocessors, circuitry, cloud-based systems, or some other processing devices or software systems, and can be distributed among multiple processing devices. Examples of device management node 120 can also include software such as an operating system, logs, data structures, databases, utilities, drivers, networking software, and other software stored on a computer-readable medium.

Communication link 140 includes one or more wireless links, and use the air or space as the transport media. Communication link 140 comprises one or more wireless communication links provided over an associated wireless frequency spectrum or wireless frequency band, and can use various protocols. In this example, communication link 140 can each comprise Long Term Evolution (LTE), LTE Advanced, Code Division Multiple Access (CDMA), Evolution-Data Optimized (EVDO), single-carrier radio transmission technology link (1xRTT), Global System for Mobile Communication (GSM), Universal Mobile Telecommunications System (UMTS), High Speed Packet Access (HSPA), Radio Link Protocol (RLP), 3rd Generation Partnership Project (3GPP) Worldwide Interoperability for Microwave Access (WiMAX), Orthogonal Frequency-Division Multiple Access (OFDMA), Single-carrier frequency-division multiple access (SC-FDMA), Wideband Code Division Multiple Access (W-CDMA), Time Division Synchronous Code Division Multiple Access (TD-SCDMA), IEEE 802.11, Wireless Fidelity (Wi-Fi), or some other cellular or wireless communication format, including combinations, improvements, or variations thereof.

Communication link 141 uses metal, glass, optical, air, space, or some other material as the transport media. Communication link 141 can use various communication protocols, such as Time Division Multiplex (TDM), asynchronous transfer mode (ATM), Internet Protocol (IP), Ethernet, synchronous optical networking (SONET), hybrid fiber-coax (HFC), Universal Serial Bus (USB), circuit-switched, communication signaling, wireless communications, or some other communication format, including combinations, improvements, or variations thereof. Communication link 141 can be a direct link or can include intermediate networks, systems, or devices, and can include a logical network link transported over multiple physical links. Communication link 141 can include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

Although one main link for each of links 140-141 is shown in FIG. 1, it should be understood that links 140-141 are merely illustrative to show communication modes or access pathways. In other examples, further links can be shown, with portions of the further wireless links shared and used for different communication sessions or different content types, among other configurations.

Figure 3:
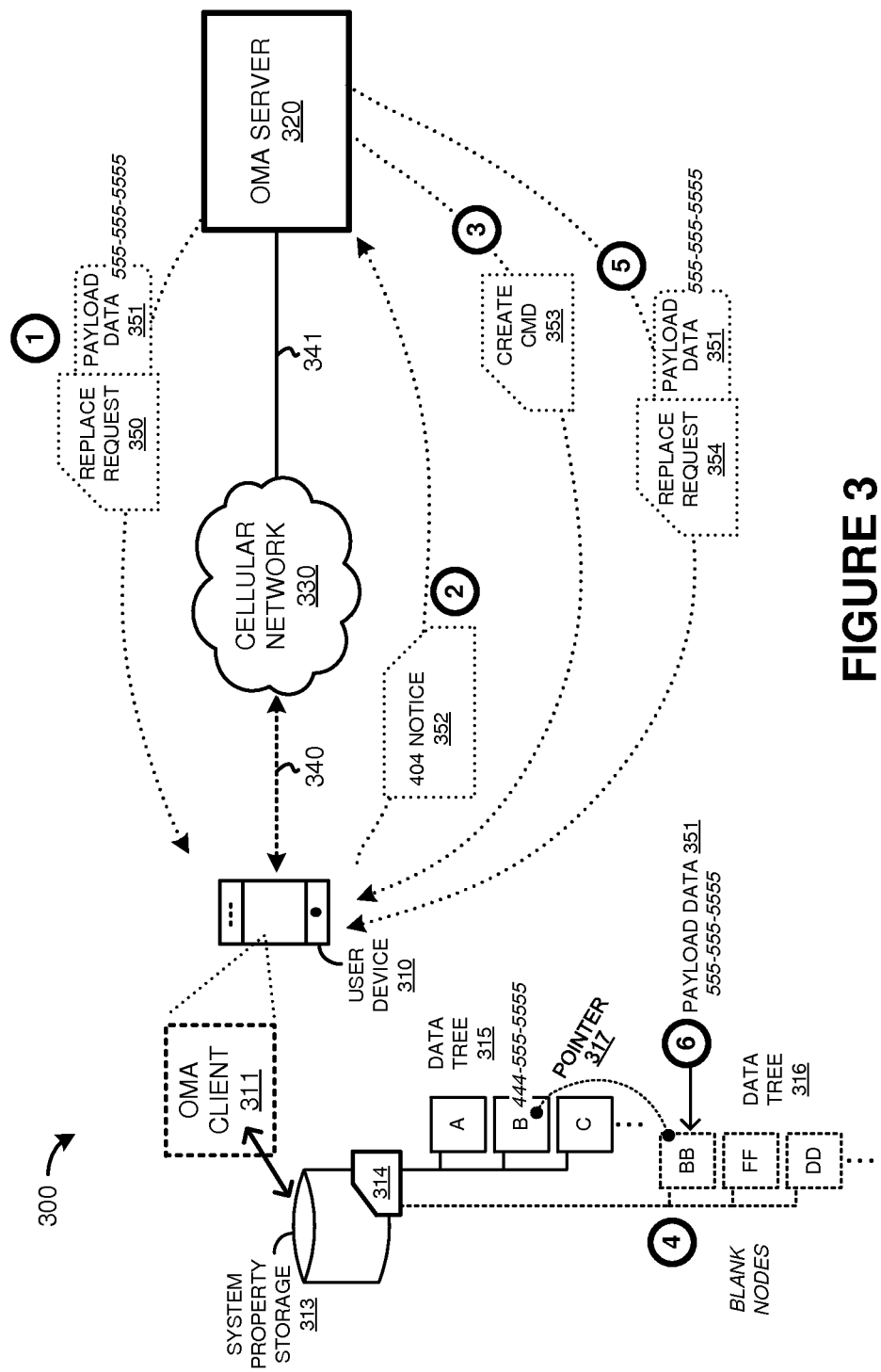
FIG. 3 is a system diagram illustrating a communication system.

As a further example for enhanced handling of configuration data in wireless communication systems, FIG. 3 is presented. FIG. 3 is a system diagram illustrating communication system 300. FIG. 300 includes user device 310, Open Mobile Alliance (OMA) server 320, and cellular network 330. User device 310 comprises a smartphone device and receives wireless access to communication services over wireless link 340 from cellular network 330. The communication services can include voice calls, text messaging, data exchange, Internet access, among other services. OMA server 320 and cellular network 330 communicate over link 341.

Cellular network 330 includes one or more wireless access nodes, such as base stations, distributed over a geographic area to provide wireless access to communication services for one or more wireless user devices, such as user device 310. To manage and configure the various user devices, OMA server 320 is included which can deliver configuration data to the user devices over cellular network 330. OMA server 320 comprises computer processing systems and equipment. OMA server 320 comprises can include communication or network interfaces, as well as computer systems, microprocessors, circuitry, cloud-based systems, or some other processing devices or software systems, and can be distributed among multiple processing devices and systems.

User device 310 includes OMA client 311 and system property storage 313. OMA client 311 comprises software executed by user device 310 which interfaces with OMA server for exchanging configuration data for user device 310. OMA client 311 stores configuration data for user device 310 in system property storage 313. Storage 313 comprises one or more computer readable storage media accessible by OMA client 311, such as included in a storage system of user device 310.

Configuration data is stored in one or more data structures, namely data trees in FIG. 3. A first data tree 315 comprises an original equipment manufacturer configuration tree, and a second data tree 316 is created by OMA client 311 with blank nodes responsive to configuration data that is not suitable for storage in data tree 315, as detailed below in FIG. 4. Data tree 315 and data tree 316 share a common data structure root 314 in this example.

In this example, data tree 315 includes OMA device management (DM) data and can represent OMA DM represents management objects of user device 310 as a hierarchical tree structure where nodes can be uniquely addressed with uniform resource identifiers (URIs). In some examples, data tree 315 comprises a Device Management Tree (DMT). OMA server 320 can obtain current configuration information from data tree 315 that indicate the various OMA DM properties of user device 310. The various tree nodes of data tree 315 can be queried by OMA server 320 by way of OMA client 311. In some examples, predetermined nodes of data tree 315 can be altered by OMA server 320. However, in many examples, some nodes cannot be altered without altering the entire data tree 315, or alternatively, some nodes of data tree 315 cannot have an associated node type changed or have additional copies of the same type within data tree 315.

Figure 4:
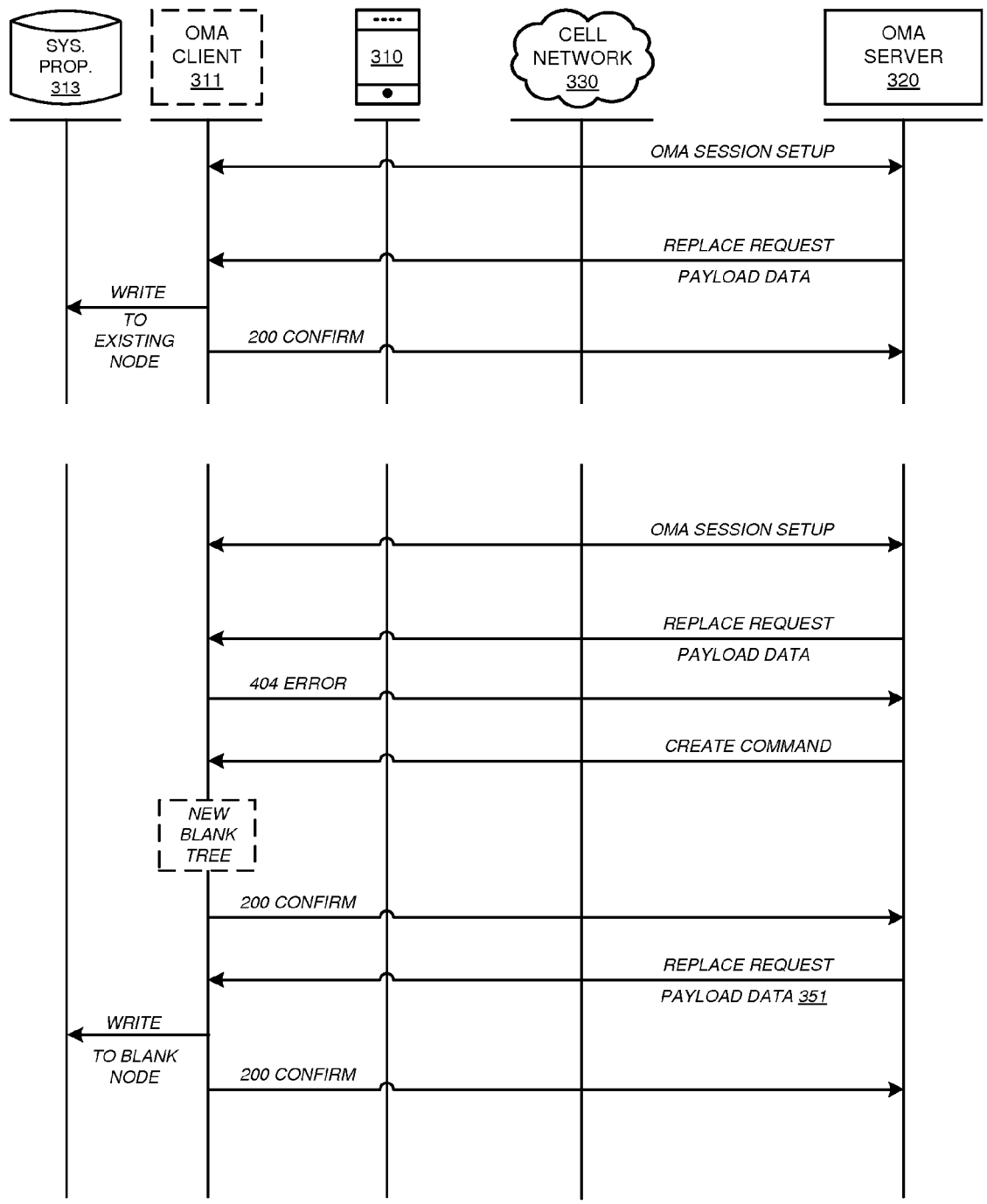
FIG. 4 is a sequence diagram illustrating a method of operation of a communication system.

To further illustrate the operations of communication system 300, FIG. 4 is presented. FIG. 4 is a sequence diagram illustrating a method of operation of communication system 300. In FIG. 4, two transactions are detailed. A first transaction illustrates a successful configuration change request without addition of a data tree, while a second transaction illustrates a successful change request with addition of data tree 316.

Turning to the first transaction, user device 310 includes OMA client 311 which interfaces with OMA server 320 to handle transfer and storage of configuration information for user device 310. First, an OMA session is setup between OMA client 311 and OMA server 320. This OMA session can comprise a (wireless application protocol) WAP push or session over SMS. The OMA session setup can include messaging from OMA server 320 to OMA client 311 in the form of notifications or alert messages, among other messaging to establish a configuration session between user device 310 and OMA server 320.

OMA server 320 issues a replace request which includes payload data. This replace request indicates a node in data tree 315 that can accept replacement data or new data indicated by the payload data. In this example, OMA client 311 accepts the payload data and writes the payload data to an existing node or node type in data tree 315 of system property storage 313. Responsive to successfully writing the payload data into data tree 315, OMA client 311 issues a "200 confirm" message for delivery to OMA server 320 to indicate that the data has successfully been incorporated into data tree 315.

Turning now to the second transaction, an OMA session is setup between OMA client 311 and OMA server 320. As with the first transaction, this OMA session setup can comprise a WAP push communication. OMA server 320 issues replace request 350 which includes payload data 351, which in this example comprises an alternate phone number for user device 310.

Replace request 350 indicates a node or node type in data tree 315 that cannot accept replacement data or new data indicated by payload data 351. OMA client 311 can compare a field or node type indicated by replace request 350 for payload data 351 to a predetermined field or node type to determine if replace request 350 should be rejected or accepted. The field or node type might indicate a node type that is not alterable in data tree 315 or might indicate a special predetermined field type which indicates a new node type is to be created which is not supported by data tree 315.

In the phone number example discussed presently, data tree 315 might be a data tree established initially for a configuration of user device 310 which already includes a phone number for user device 310. In order to incorporate a different phone number into data tree 315, and entirely new replacement configuration tree might need to be established for user device 310, such as a replacement data tree transferred by OMA server 320, which can be time consuming and wasteful of wireless resources to transfer many nodes unrelated to the desired replacement data for a single node. Also, user device 310 might wish to have more than one phone number associated therewith, and data tree 315 might be configured to only store one unique phone number for user device 310. A user might wish to have more than one phone number associated with user device 310 when using both traditional circuit switched phone services (such as 1xRTT voice call services) and packet-based phone services (such as Voice over IP (VoIP) services). A user might wish to establish a phone number unique to each service, or might wish to alter the phone numbers occasionally. Additionally, a user might initially establish user device 310 for voice calls over a first service, and then desire to use a second service for voice calls in addition to the first service. A first data tree might be associated with the first service, which cannot be altered in situ to accommodate the second service.

In this example, OMA client 311 does not incorporate payload data 351 into data tree 315 and instead issues a rejection message for delivery to OMA server 320, namely "404" notice 352 for delivery to OMA server 320. Responsive to "404" notice 352, OMA server 320 issues create command 353. Create command 353 indicates to create a new data tree in user device 310 which can be used to contain payload data 351.

OMA client 311 creates data tree 316 responsive to create command 353, and populates data tree 316 with at least one blank node. In FIG. 3, at least three blank nodes are shown for data tree 316. The blank nodes can comprise an entire OMA configuration tree, but with each node incorporating blank, generic, or placeholder data that can be overwritten with configuration data at a later time. The blank nodes can also comprise a subset of nodes of an OMA configuration tree, such as a small number of nodes which are flexible in node type or with undefined node types that can be configured as various node types by OMA client 311.

Once data tree 316 has been created in system property storage 313, OMA client 311 issues a success message for delivery to OMA server 320, namely a "200 confirm" message that indicates creation of data tree 316. Responsive to the "200 confirm" notice, OMA server 320 re-issues a replace request with payload data 351. In FIG. 3 this is shown as replace request 354 which includes payload data 351. Once OMA client 311 receives replace request 354, OMA client 311 can incorporate payload data 351 into the new data tree 361. OMA client 311 issues another "200 confirm" message for delivery to OMA server 320 responsive to incorporating payload data 351 into data tree 316.

To incorporate payload data 351 into data tree 316, OMA client 311 can overwrite placeholder data or generic data in one of the blank nodes of data tree 316 with payload data 351. A node type or node properties can also be changed to correspond to a data type of payload data 351. For example, a phone number could be written into node "BB" and a node type of node "BB" can be changed to indicate a phone number is stored therein.

Additionally, a logical address pointer can be employed to link a node of data tree 315 to a node in data tree 316. As shown in FIG. 3, node 'B' of data tree 315 is linked via logical address pointer 317 to node 'BB' of data tree 316. The logical address pointer can be used to link an existing node in a data tree to a new node in another data tree. For example, when a node in data tree 315 cannot be modified, a logical pointer can be established to a node in data tree 316 which includes modified or alternate data for the node type of the linked node in data tree 315. In this manner, data tree 315 is not modified but instead a node in data tree 316 can include altered or modified data that points to a specified node in data tree 315. In FIG. 3, node "B" can indicate a phone number, such as a first phone number associated with user device 310. Node "BB" can be linked via a pointer to node "B" and node "BB" can indicate another phone number for device 310. In this manner, data tree 315 can remain unaltered but can be supplemented by data tree 316 to accommodate changes or alterations to the data in data tree 315 and multiple phone numbers can be supported by user device 310 in configuration data maintained by OMA client 311 in system property storage 313.

It should be understood that other configuration data can be handled in a similar manner to the phone number example in FIGS. 3 and 4. For example, software updates, device identities, service properties, access properties, or other properties and parameters can be stored in data tree 316 after being incorporated into blank or generic nodes of data tree 316. Advantageously, data tree 315 can remain unaltered and data tree 316 (or additional data trees) can accommodate alternate configuration data sets or changes to data found in data tree 315 without altering data tree 315.

Figure 5:
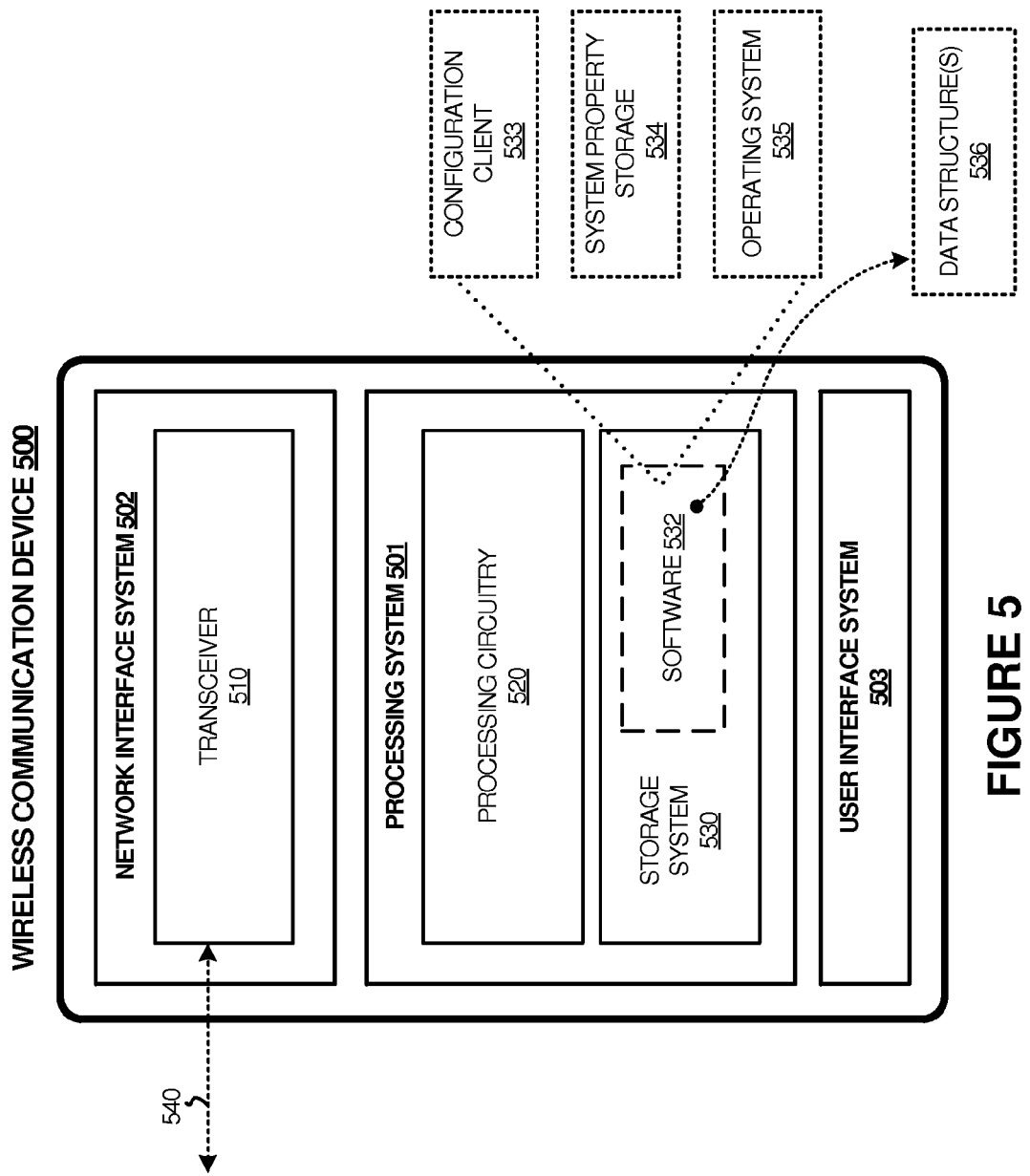
FIG. 5 is a block diagram illustrating a wireless communication device.

FIG. 5 is a block diagram illustrating wireless communication device 500. Wireless communication device 500 can include equipment and systems as discussed herein for wireless communication device 110 in FIG. 1 and user device 310 in FIG. 3, although variations are possible. Wireless communication device 500 includes processing system 501, network interface system 502, and user interface system 503. Processing system 501 further includes processing circuitry 520 and storage system 530. Network interface system 502 further includes transceiver 510. In operation, processing circuitry 520 is operatively linked to transceiver 510, storage system 530, and user interface system 503 by one or more communication interfaces, which can comprise a bus, discrete connections, network links, software interfaces, or other circuitry. Wireless communication device 500 can be distributed or consolidated among equipment or circuitry that together forms the elements of wireless communication device 500. Wireless communication device 500 can optionally include additional devices, features, or functionality not discussed here for purposes of brevity.

Network interface system 502 includes one or more network interfaces. In wireless communication device 500, network interface system 502 includes transceiver 510. Transceiver 510 includes at least one wireless communication interface for communicating over wireless links, such as described for wireless link 140 in FIG. 1 or wireless link 340 in FIG. 3. Transceiver 510 includes antennas, power amplifiers, RF circuitry, transceivers, network interface card equipment, modems, and other communication circuitry. In this example, transceiver 510 communicates over link 540. Link 540 can include one or more wireless links as described herein, such as that described for link 140 in FIG. 1 and link 340 in FIG. 3, although variations are possible.

Processing circuitry 520 can comprise one or more microprocessors and other processing circuitry that retrieves and executes software 532 from storage system 530. Processing circuitry 520 can be implemented within a single processing device but can also be distributed across multiple processing devices or sub-systems that cooperate in executing program instructions. Examples of processing circuitry 520 include general purpose central processing units, application specific processors, and logic devices, as well as any other type of processing device, combinations, or variations thereof. In some examples, portions of processing circuitry 520 is physically separate from some elements of Wireless communication device 500 and area included in remote servers, cloud-based processing systems, or virtualized computing systems.

Storage system 530 can comprise any non-transitory computer readable storage media capable of storing software 532 that is executable by processing circuitry 520. Storage system 530 also includes data structures 536 which include one or more trees, databases, tables, lists, or other data structures that store configuration data for wireless communication device 500. Storage system 530 can include volatile and nonvolatile, removable and non-removable media implemented in any method or technology for storage of information, such as computer readable instructions, data structures, program modules, or other data. Storage system 530 can be implemented as a single storage device but can also be implemented across multiple storage devices or sub-systems co-located or distributed relative to each other. Storage system 530 can comprise additional elements, such as a controller, capable of communicating with processing circuitry 520. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof.

Software 532 can be implemented in program instructions and among other functions can, when executed by wireless communication device 500 in general or processing circuitry 520 in particular, direct wireless communication device 500, processing system 501, or processing circuitry 520 to receive data transferred by a device management node for incorporation into a node of a configuration data tree, identify the data as unable to be incorporated into the configuration data tree, transfer a rejection notice for delivery to the device management node, receive a node addition instruction and responsively create a new data tree that is populated with at least one blank node and is linked to a root node shared with the configuration data tree, and responsively incorporate the data into the blank node of the new data tree, among other operations. Software 532 can include additional processes, programs, or components, such as operating system software, database software, or application software. Software 532 can also comprise firmware or some other form of machine-readable processing instructions executable by elements of processing system 501, such as processing circuitry 520.

In at least one implementation, the program instructions can include configuration client 533, system property storage 534, and operating system 535. Configuration client 533 interfaces with a configuration server, such as OMA server 320 in FIG. 3, to receive and transfer configuration data. Configuration client 533 can store and retrieve configuration data stored in system property storage 534 in one or more data structures, such as data trees. Configuration client 533 can create new data trees with generic or blank nodes responsive to commands received from a configuration server. System property storage 534 stores system properties for wireless communication device 500, such as configuration data discussed herein. Operating system 535 provides various storage interface elements, such as device drivers, application programming interfaces, or other software elements to allow system property storage 534 to interface with computer readable storage elements of wireless communication device 500.

In general, software 532 can, when loaded into processing circuitry 520 and executed, transform processing circuitry 520 overall from a general-purpose computing system into a special-purpose computing system customized to receive data transferred by a device management node for incorporation into a node of a configuration data tree, identify the data as unable to be incorporated into the configuration data tree, transfer a rejection notice for delivery to the device management node, receive a node addition instruction and responsively create a new data tree that is populated with at least one blank node and is linked to a root node shared with the configuration data tree, and responsively incorporate the data into the blank node of the new data tree, among other operations. Encoding software 532 on storage system 530 can transform the physical structure of storage system 530. The specific transformation of the physical structure can depend on various factors in different implementations of this description. Examples of such factors can include, but are not limited to the technology used to implement the storage media of storage system 530 and whether the computer-storage media are characterized as primary or secondary storage. For example, if the computer-storage media are implemented as semiconductor-based memory, software 532 can transform the physical state of the semiconductor memory when the program is encoded therein. For example, software 532 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

User interface system 503 includes equipment and circuitry for receiving user input and control, such as for engaging in voice calls or data sessions, and receiving user instructions for text or video messages, among other operations. Examples of the equipment and circuitry for receiving user input and control include push buttons, touch screens, selection knobs, dials, switches, actuators, keys, keyboards, pointer devices, microphones, transducers, potentiometers, non-contact sensing circuitry, accelerometers, or other human-interface equipment. User interface system 503 also includes equipment to communicate information to a user of wireless communication device 500. Examples of the equipment to communicate information to the user could include displays, indicator lights, lamps, light-emitting diodes, haptic feedback devices, audible signal transducers, speakers, buzzers, alarms, vibration devices, or other indicator equipment, including combinations thereof.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of handling device configuration data in a wireless communication device, the method comprising:
   receiving a configuration change request transferred by a device management node, the configuration change request comprising payload data for incorporation into one of a plurality of nodes of a configuration data tree that stores at least the device configuration data for the wireless communication device;
   identifying the payload data as unable to be incorporated into the configuration data tree, and responsively rejecting the configuration change request by at least transferring a rejection notice for delivery to the device management node;
   receiving a node addition instruction transferred by the device management node, and responsively creating a new data tree that is populated with at least one blank node and is linked to a root node shared with the configuration data tree; and
   receiving a further configuration change request transferred by the device management node, the further configuration change request comprising the payload data for incorporation into the new data tree, and responsively incorporating the payload data into the blank node of the new data tree.

2. The method of claim 1, wherein identifying the payload data as unable to be incorporated into the configuration data tree comprises comparing a configuration data type of the payload data against a plurality of configuration data types included in the configuration data tree, and identifying that the payload data is unable to be incorporated into the configuration data tree when the configuration data type does not match any of the plurality of configuration data types.

3. The method of claim 1, wherein creating the new data tree that is populated with at least the one blank node and is linked to the root node shared with the configuration data tree comprises establishing the new data tree as traversable from the root node.

4. The method of claim 3, wherein the at least one blank node is linked to a pointer node in the confirmation data tree using at least a pointer to the at least one blank node in the new data tree.

5. The method of claim 1, wherein incorporating the payload data into the blank node of the new data tree comprises overwriting placeholder data of the blank node with the payload data and assigning a configuration data type of the blank node to a configuration data type indicated by the payload data.

6. The method of claim 1, further comprising:
   responsive to incorporating the payload data into the blank node of the new data tree, transferring a success message for delivery to the device management node.

7. The method of claim 1, wherein the configuration change request comprises a request to modify access parameters for the wireless communication device to access communication services of a cellular communication network.

8. The method of claim 1, wherein the payload data comprises a string of information corresponding to one or more of a device identification number, phone number, access parameter, and service parameter for the wireless communication device.

9. The method of claim 1, wherein the configuration data tree comprises an Open Mobile Alliance (OMA) Device Management (DM) tree.

10. The method of claim 9, wherein the new data tree comprises a data tree comprising a plurality of blank nodes with a first node of the new data tree linked to the root node associated with the OMA DM tree.

11. A wireless communication device, comprising:
   a network transceiver configured to receive a configuration change request transferred by a device management node, the configuration change request comprising payload data for incorporation into one of a plurality of nodes of a configuration data tree that stores at least the device configuration data for the wireless communication device;
   processing circuitry configured to identify the payload data as unable to be incorporated into the configuration data tree, and responsively reject the configuration change request by at least transferring a rejection notice for delivery to the device management node;

the network transceiver configured to receive a node addition instruction transferred by the device management node, and the processing circuitry configured to responsively create a new data tree that is populated with at least one blank node and is linked to a root node shared with the configuration data tree; and the network transceiver configured to receive a further configuration change request transferred by the device management node, the further configuration change request comprising the payload data for incorporation into the new data tree, and the processing circuitry configured to responsively incorporate the payload data into the blank node of the new data tree.

12. The wireless communication device of claim 11, comprising:

the processing circuitry configured to compare a configuration data type of the payload data against a plurality of configuration data types included in the configuration data tree, and identify that the payload data is unable to be incorporated into the configuration data tree when the configuration data type does not match any of the plurality of configuration data types.

13. The wireless communication device of claim 11, comprising:

the processing circuitry configured to establish the new data tree as traversable from the root node.

14. The wireless communication device of claim 13, wherein the at least one blank node is linked to a pointer node in the confirmation data tree using at least a pointer to the at least one blank node in the new data tree.

15. The method of claim 11, comprising:

the processing circuitry configured to overwrite placeholder data of the blank node with the payload data and assign a configuration data type of the blank node to a configuration data type indicated by the payload data to incorporate the payload data into the blank node of the new data tree.

16. The wireless communication device of claim 11, comprising:

responsive to incorporating the payload data into the blank node of the new data tree, the network transceiver configured to transfer a success message for delivery to the device management node.

17. The wireless communication device of claim 11, wherein the configuration change request comprises a request to modify access parameters for the wireless communication device to access communication services of a cellular communication network.

18. The wireless communication device of claim 11, wherein the payload data comprises a string of information corresponding to one or more of a device identification number, phone number, access parameter, and service parameter for the wireless communication device.

19. The wireless communication device of claim 11, wherein the configuration data tree comprises an Open Mobile Alliance (OMA) Device Management (DM) tree.

20. The wireless communication device of claim 19, wherein the new data tree comprises a data tree comprising a plurality of blank nodes with a first node of the new data tree linked to the root node associated with the OMA DM tree.

* * * * *